United States Patent
Lopez Rubio et al.

(10) Patent No.: US 9,528,495 B2
(45) Date of Patent: Dec. 27, 2016

(54) SMART POWER MANAGEMENT DURING VOLTAGE DIP IN WIND TURBINES

(71) Applicant: Gamesa Innovation & Technology, S.L., Sarriguren (Navarra) (ES)

(72) Inventors: Jose Maria Lopez Rubio, Madrid (ES); Francisco Jimenez Buendia, Sarriguren (ES); Juan Carlos Garcia Andujar, Madrid (ES)

(73) Assignee: GAMESA INNOVATION & TECHNOLOGY, S. L., Sarriguren (Navarra) (ES)

( * ) Notice: Subject to any disclaimer, the term of this patent is extended or adjusted under 35 U.S.C. 154(b) by 346 days.

(21) Appl. No.: 14/444,329

(22) Filed: Jul. 28, 2014

(65) Prior Publication Data
US 2015/0035281 A1 Feb. 5, 2015

(30) Foreign Application Priority Data
Aug. 2, 2013 (ES) .................................. 201300728

(51) Int. Cl.
*G06F 19/00* (2011.01)
*F03D 7/02* (2006.01)

(52) U.S. Cl.
CPC ........... *F03D 7/0224* (2013.01); *F03D 7/0284* (2013.01); *F03D 7/0296* (2013.01);
(Continued)

(58) Field of Classification Search
CPC ..... F03D 7/0224; F03D 7/0296; Y02E 10/723
See application file for complete search history.

(56) References Cited

U.S. PATENT DOCUMENTS 8,428,784 B2 * 4/2013 Krueger ................. F03D 7/042
290/44
8,823,191 B2 * 9/2014 Andresen ............. F03D 7/0284
290/44

(Continued)

OTHER PUBLICATIONS

Morren, Johan, and Sjoerd WH De Haan. "Ridethrough of wind turbines with doubly-fed induction generator during a voltage dip." IEEE Transactions on energy conversion 20.2 (2005): 435-441.*

(Continued)

*Primary Examiner* — Michael D Masinick
(74) *Attorney, Agent, or Firm* — Ladas & Parry LLP (57) ABSTRACT

The present invention is directed to a method of reducing a mechanical load on the occurrence of voltage dip in the wind turbines. The wind turbine generator controller and the converter control unit work in combination to control the oscillation generated due to voltage dip in the wind turbine 100. The method applies a ramp in power recovery to allow the enhanced DTD damp oscillations before the peak in torque happens. The method involves the step of: delivering a maximum active power value by the converter control unit to the wind turbine generator controller. Next step is setting a saturation value for the set points to enhance the drive train limits. In the next step, ramping is applied to the power set points of the wind turbine generator. And finally an enhanced drive train damping s applied to the ramped value of the power in order to reduce the mechanical load in the wind turbine and to damp the oscillation in the wind turbine generator.

10 Claims, 7 Drawing Sheets

(52) U.S. Cl.
CPC ............... *F05B 2270/10711* (2013.01); *F05B 2270/337* (2013.01); *Y02E 10/723* (2013.01)

(56) References Cited

U.S. PATENT DOCUMENTS

| | | | | |
|---|---|---|---|---|
| 9,018,782 | B2 * | 4/2015 | Couchman | F03D 7/028 290/44 |
| 9,328,718 | B2 * | 5/2016 | Nielsen | F03D 7/048 |
| 2008/0303281 | A1 * | 12/2008 | Krueger | F03D 7/042 290/44 |
| 2012/0143537 | A1 * | 6/2012 | Nielsen | F03D 7/048 702/60 |
| 2013/0257051 | A1 * | 10/2013 | Spruce | F03D 7/028 290/44 |
| 2013/0270827 | A1 * | 10/2013 | Couchman | F03D 7/028 290/44 |
| 2014/0248123 | A1 * | 9/2014 | Turner | F03D 7/0292 415/1 |

OTHER PUBLICATIONS

El-Moursi, Mohamed S., Birgitte Bak-Jensen, and Mansour H. Abdel-Rahman. "Novel STATCOM controller for mitigating SSR and damping power system oscillations in a series compensated wind park." IEEE Transactions on Power electronics 25.2 (2010): 429-441.*

Hansen, Anca D., and Gabriele Michalke. "Fault ride-through capability of DFIG wind turbines." Renewable energy 32.9 (2007): 1594-1610.*

Xing, Zuo-xia, et al., "Damping Control Study of the Drive Train of DFIG Wind Turbine", 2009 International Conference on Energy and Environment Technology, pp. 576-579, 2009.

* cited by examiner

SMART POWER MANAGEMENT DURING VOLTAGE DIP IN WIND TURBINES

FIELD OF THE INVENTION

The present invention generally relates to wind turbines, and more particularly to, a method for reducing the mechanical loads by means of a smart power management during voltage dips in the wind turbines.

BACKGROUND OF THE DISCLOSURE

A wind turbine converts the kinetic energy of wind into electrical energy which is then transmitted to a substation at a wind farm. Generally, in a wind turbine, a nacelle houses components along with a drive train for converting the mechanical energy into electricity. The drive train in a wind turbine is usually meant the assembly of a rotor, rotor shaft, gear box, generator shaft, coupling and generator. The wind turbines are designed to withstand several on field operating scenarios (normal operation, extreme gusts, grid loss, blocked blade, etc).

Nowadays, the impact of wind turbines on the grid is no longer negligible so network operators are making stricter the wind turbine grid connection requirements. Some of these requirements are defined in terms of the voltage dips that the wind turbines must be able to withstand without disconnecting from the grid, and the maximum time to recover the power production after the grid recovers from the grid.

Voltage dip scenario is one of the most difficult operating cases for a wind turbine. The occurrence of a voltage dip in the grid originates a transitory that affects not only to the electrical performance of the wind turbine but also to the mechanical one. In case of a disturbance on the network, when the voltage goes below a certain value, it is mandatory to decrease the wind turbine power production due to electrical restrictions. As the dip voltage dynamics are very fast, this reduction is required to be made in a very abrupt way. The only way to get such reduction in a short time is by decreasing the generator torque. The torque dip excites the drive train in its resonant frequency, resulting in drive train oscillations. Considering that the aerodynamic torque remains the same (same wind speed and pitch angle), the generator speed increases due to the difference between generator torque and rotor torque. If the over-speed protection system is triggered, the wind turbine is disconnected from the grid and stopped which default on the network operator requirements. As a consequence, the first objective is to limit the generator speed during the disturbance. This must be done without generating other kind of alarms and keeping aerodynamic torque enough to recover the previous dip voltage power production in the short time required by the network operator.

As said before the network operators requirements do not only define the voltage dips that the wind turbines must be able to withstand but also, the maximum time to recover the power production after the grid recovers from the grid. As in any close loop the wind turbine generator torque control is going to exhibit a maximum overshoot and damp oscillations before reaching the steady state. This maximum torque overshoot highly depends on the way the control provides the torque recovery in terms of the torque value applied but also the drive train oscillation phase at its natural frequency, that has been excited by the fast torque change along the voltage dip. So the transient respond of the system when recovering from the grid is going to depend on the control logics followed. Some control methods have been used in the past focused on changing the current drive train damper operation during voltage dip transients These logics do not improve the way the generator torque and pitch angles are controlled to fulfilled the settling time requirements minimizing the maximum overshoot, either the best way to integrate the drive train action to get the best damping of the drive train main frequency oscillation mode or the way to improve the converter controller and wind turbine controller cooperation. In another approach, the solution has been provided in terms of electrical design, the use of full converter with brake chopper can reduces the torque overshoot in the drive train. This method needs installation of new wind turbine generators and extra cost.

SUMMARY OF THE DISCLOSURE

The above-mentioned shortcomings, disadvantages and problems are addressed herein which will be understood by reading and understanding the following specification.

The present invention is directed to a method of reducing mechanical load during a voltage dip in a wind turbine. The wind turbine having a drive train, a wind turbine generator, a wind turbine generator controller and a converter control unit. The wind turbine controller and the converter control unit work in combination to control the oscillation generated due to voltage dip in the wind turbine 100. The method: Applies an optimized pitch reference to minimize oscillations, avoid overspeed values, and keep aerodynamic torque enough to recover power production in a short time after the grid recovers. Applies a controlled ramped power reference with different rates and filters it with a first order if needed to reduce the torque overshoot when recovering form the voltage dip, fulfilling the settling time requirements and integrating in the best way the drive train damper action. The method comprises the step of the wind turbine controller receiving information from the converter control unit to know that a voltage dip is taking place. In the next step, the wind turbine controller calculates the current aerodynamic torque and derivative of torque with respect to pitch angle to know the remaining aerodynamic torque during any moment of the voltage dip, a minimum pitch rate is applied to avoid generator overspeed keeping aerodynamic torque enough to recover power production after the dip. After the grid recovers from the voltage dip, a maximum power or torque value is delivered by a converter control unit to a wind turbine controller. With respect to this instantaneous limit the wind turbine controller calculates a more restrictive limit subtracting an offset to make sure that it is going to be possible to apply the DTD torque or power reference. A generator torque or power reference is calculated using different rates depending on the drive train oscillations, to minimize the transient torque overshoot and to enhance the damping to the drive train eigenfrequency oscillation mode taking into account the maximum power or torque calculated value and settling time restrictions. This reference is filtered with a first order filter if needed. And finally, enhanced drive train damping is applied to the ramped reference to add extra damping to the drive train eigenfrequency oscillation mode.

Others will become apparent to those skilled in the art upon consideration of the following detailed description of illustrative embodiments exemplifying the best mode of carrying out the invention as presently perceived.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

While the present disclosure can take many different forms, for the purpose of promoting an understanding of the principles of the disclosure, reference will now be made to the embodiments illustrated in the drawings, and specific language will be used to describe the same. No limitation of the scope of the disclosure is thereby intended. Various alterations, further modifications of the described embodiments, and any further applications of the principles of the disclosure, as described herein, are contemplated.

The present invention is directed to a method of reducing wind turbine mechanical loads during and when recovering without stopping from a voltage dip in the grid. The wind turbine having a drive train, a wind turbine generator, a wind turbine controller and a converter control unit. The wind turbine controller and the converter control unit work in combination to minimize the oscillation generated due to voltage dip in the wind turbine 100. The method: Applies an optimized pitch reference to minimize oscillations, avoid overspeed values, and keep aerodynamic torque enough to recover power production in a short time after the grid recovers. Applies a controlled ramped power reference with different rates to reduce the torque overshoot when recovering form the voltage dip, fulfilling the settling time requirements and integrating in the best way the drive train damper action. The method comprises the step of the wind turbine controller receiving information from the converter control unit to know that a voltage dip is taking place. In the next step, the wind turbine controller calculates the current aerodynamic torque and derivative of torque with respect to pitch angle to know the remaining aerodynamic torque during any moment of the voltage dip, a minimum pitch rate is applied to avoid generator overspeed keeping aerodynamic torque enough to recover power production after the dip. After the grid recovers from the voltage dip, a maximum power or torque value is delivered by a converter control unit to a wind turbine controller. With respect to this instantaneous limit the wind turbine controller calculates a more restrictive limit subtracting an offset to the previous value to make sure that it is going to be possible to apply the DTD ('Drive Train Damper') torque reference. A generator torque or power reference is calculated using different rates depending on the drive train oscillations, to minimize the transient torque overshoot and to enhance the damping to the drive train eigenfrequency oscillation mode taking into account the maximum power or torque calculated value and settling time restrictions. This reference is filtered with a first order filter if needed. And finally, enhanced drive train damping is applied to the ramped reference to add extra damping to the drive train eigenfrequency oscillation mode.

Figure 1:
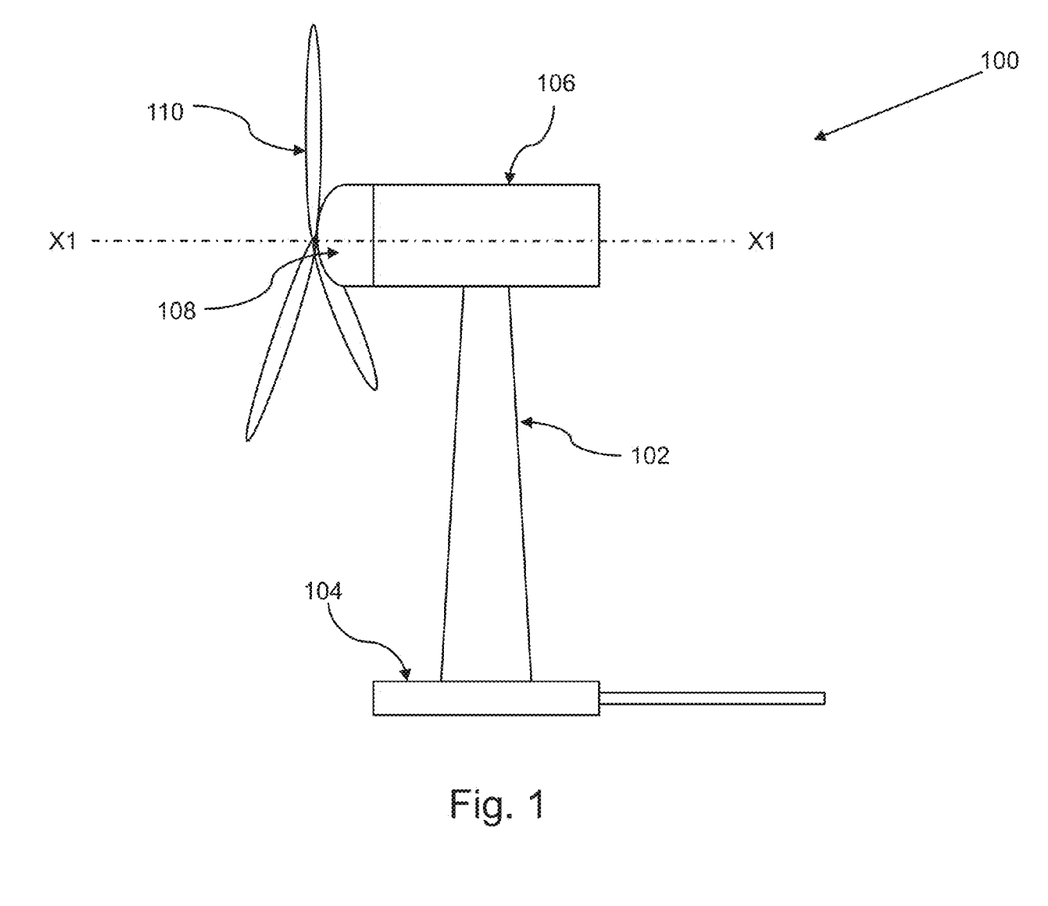
FIG. 1 shows a perspective view of a wind turbine according to an embodiment of the disclosure.

FIG. 1 is a side view showing a wind turbine 100 according to an illustrative embodiment of the disclosure. The illustrated wind turbine 100 includes a wind turbine tower (hereinafter referred to as "tower") 102 vertically erected on a foundation 104, a nacelle 106 mounted at the upper end of the tower 102, and a rotor head 108 mounted at the front end of the nacelle 106 so as to be supported rotatably about a substantially horizontal lateral rotation axis X1-X1. The rotor head 108 has a plurality of wind turbine blades 110 (for example, three as shown in FIG. 1) mounted in a radial pattern about its rotation axis. Thus, the power of wind blowing against the wind turbine blades 110 from the direction of the rotation axis of the rotor head 108 is converted to motive power that rotates the rotor head 108 about the rotation axis. The usable power generated by the wind turbine 100 is fed through the power supply line to the substation. An anemometer (not shown in the figure) that measures the wind speed value in the vicinity and an anemoscope (not shown) that measures the wind direction are disposed at appropriate locations of the outer peripheral surface (for example, at the top, etc.) of the nacelle 106.

Figure 2:
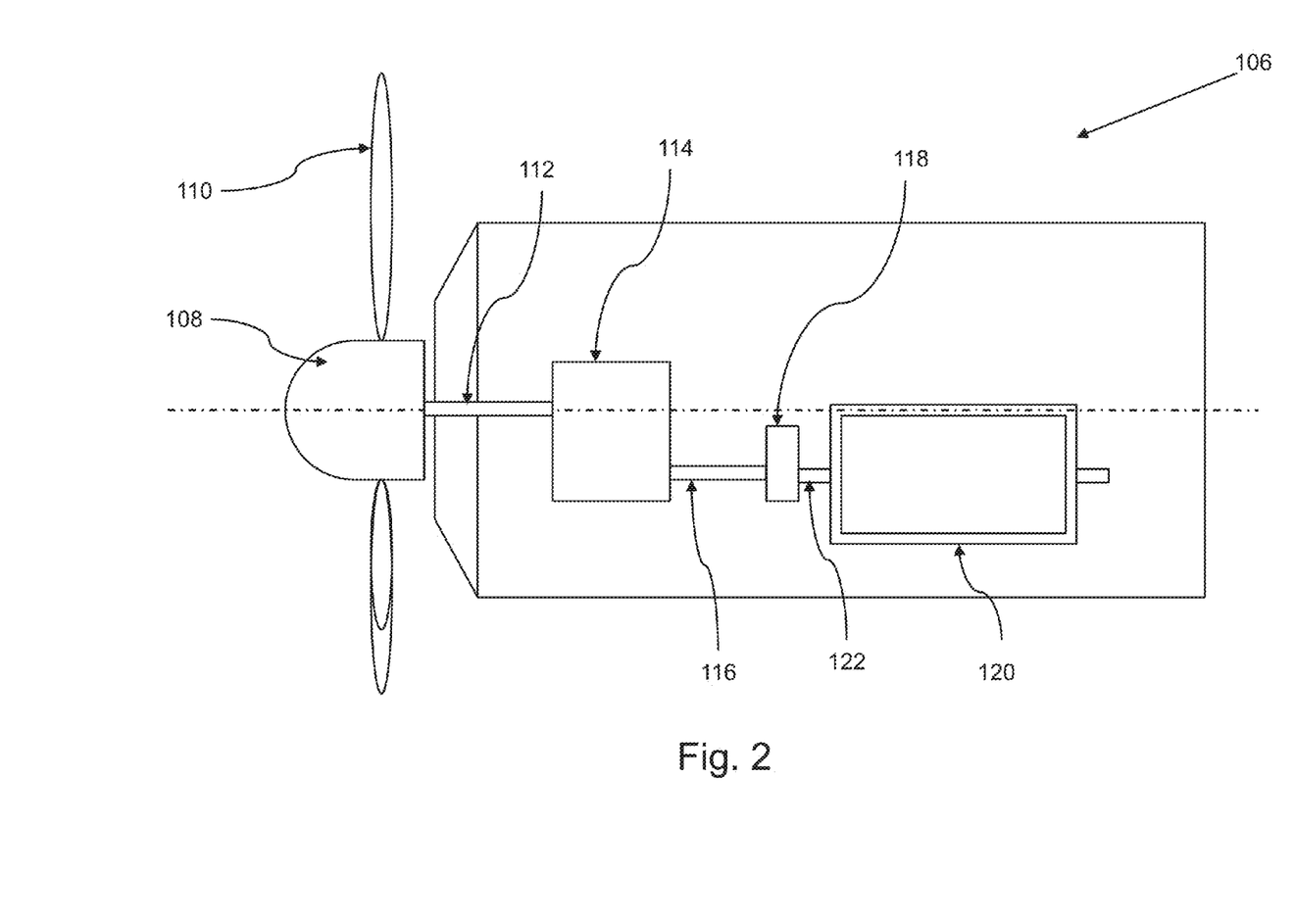
FIG. 2 shows a side view of a nacelle according along with a drive train according to the embodiment shown in FIG. 1.

FIG. 2 shows a perspective side view of the nacelle 106 according to the embodiment described in FIG. 1. The nacelle 106 includes various components which are the part of the drive train of the wind turbine 100. The nacelle 106 includes a rotor shaft 112, a gear box 114, a generator shaft 116, a coupling 118 and a wind turbine generator 120 (WTG) or generator 120. As a result of the movement of wind turbine blades 110, the rotor shaft 112 is rotated. The rotor shaft 112 runs out into the gearbox 114. The output shaft of the gear box 114 is called as the generator shaft 116. The generator shaft 116 is connected with an input shaft 122 of the generator 120 via the coupling 118.

Figure 3:
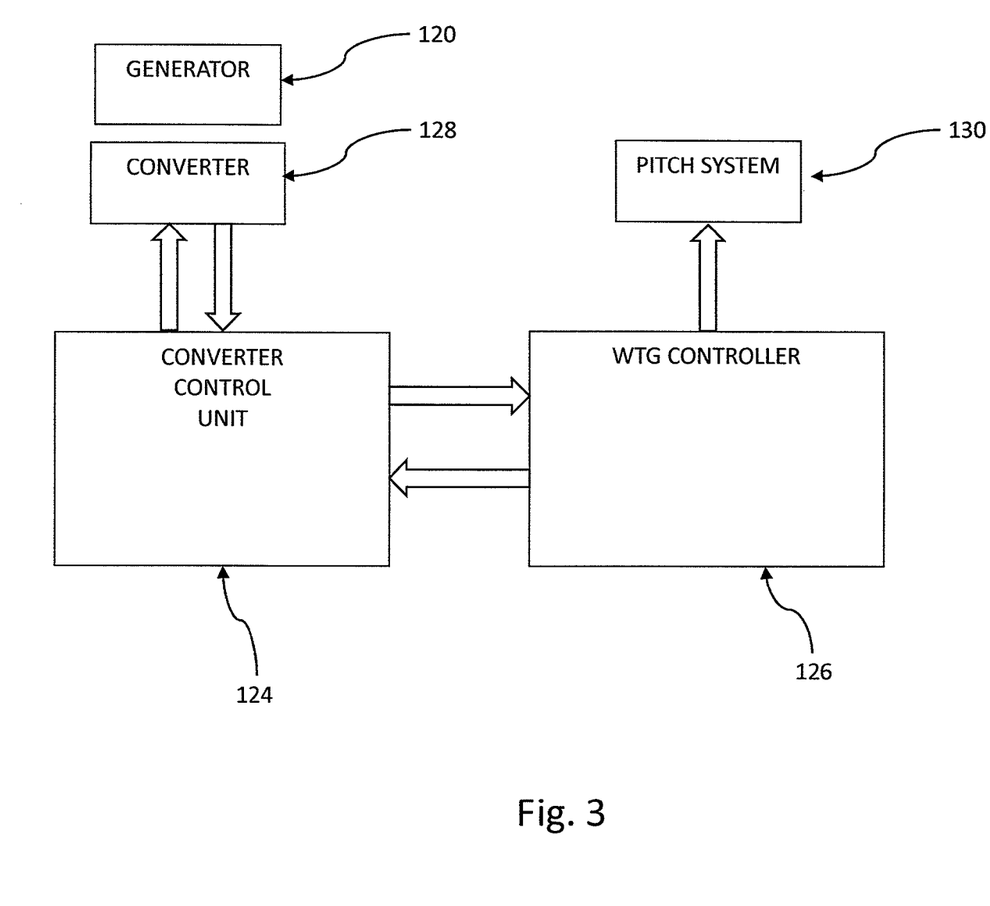
FIG. 3 shows a block diagram showing communication between the WTG controller and converter control unit for smart power or torque management according to an embodiment of the disclosure.

The wind turbine 100 further includes a converter control unit 124 and a wind turbine controller 126 or WTG controller 126. The converter control unit 124 and the WTG controller 126 are in electrical communication with each other as shown in FIG. 3. The WTG controller 126 takes input from the converter control unit 124 and send the control signals back. The converter control unit 124 takes electrical measurements from different sensors and send the control signal to the electrical parts of the wind turbine 100. According to an embodiment of the disclosure, converter control unit 124 and WTG controller 126 works in combination to control the oscillation generated due to voltage dip in the wind turbine 100. The method: Applies an optimized pitch reference to minimize oscillations, avoid overspeed values, and keep aerodynamic torque enough to recover power production in a short time after the grid recovers. Applies a controlled ramped power reference with different rates to reduce the torque overshoot when recovering form the voltage dip, fulfilling the settling time requirements and integrating in the best way the drive train damper action and filters it with a first order filter if necessary.

Figure 4:
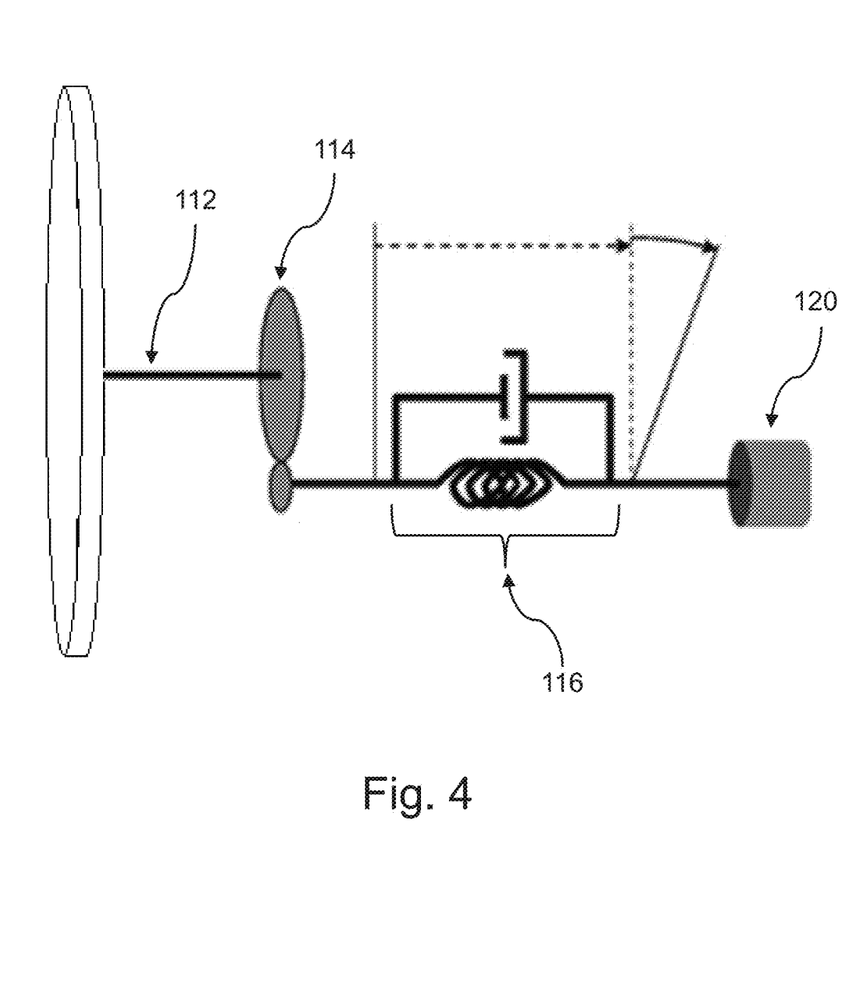
FIG. 4 is a two masses torsional spring and damping drive train model of the wind turbine shown in FIG. 1.

In stability analysis of a system, when the system response to heavy disturbances is analyzed, the generator shaft of the system must be approximated by at least a two mass model as discussed in a paper by Xing et. al., "Damping Control Study of the Drive Train of DFIG Wind Turbine", 2009. In the present case, the system is the wind turbine 100 and the voltage dips occurrence in the wind turbine 100 is considered as the disturbances.

Figure 5:
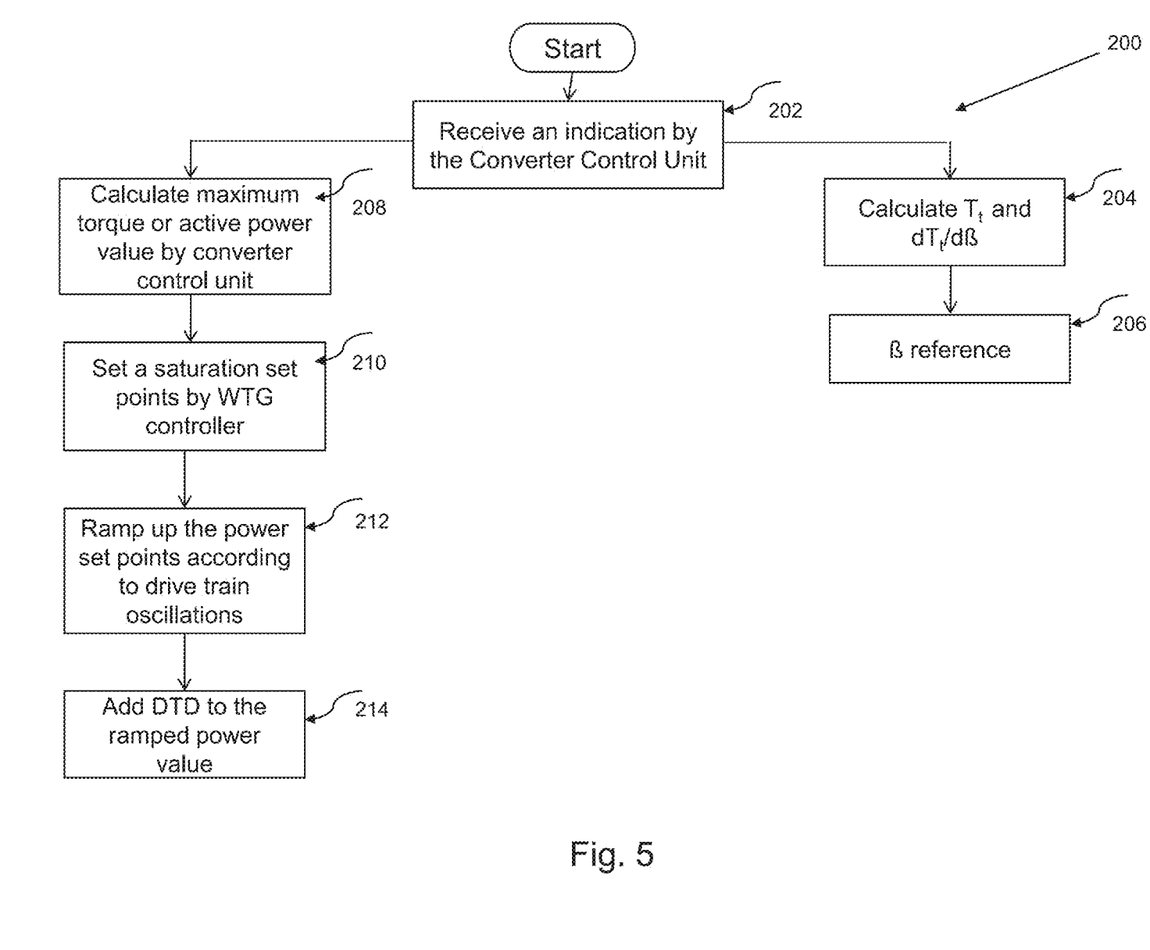
FIG. 5 is a flowchart illustrating the steps involved in a method of reducing mechanical load on the wind turbine according to an embodiment of the disclosure.

FIG. 5 shows a flowchart 200 illustrating the steps involved in the method of reducing mechanical load on the wind turbine 100 according to an embodiment of this disclosure. Initially at step 202, an indication is received by the WTG controller 126. The indication is sent by the converter control unit 124. The indication indicates the occurrence of the voltage dip in the wind turbine 100. The occurrence of voltage dip affects both the electrical performance and the mechanical performance of the wind turbine 100. Previous to voltage dip, the generator 120 speed is stable (controlled) and transmitted torque $T_t$ (aerodynamic torque) is equal to stable generator torque $T_g$. Whenever the voltage dip appears, it originates an abrupt change in the generator torque. The sudden change in generator torque excites the drive train at its resonant frequency and the generator 120 accelerates due to the difference between $T_t$ and $T_g$. At step 204, the WTG controller 126 calculates the aerodynamic torque and derivative of torque with respect to pitch angle to know the remaining aerodynamic torque during any moment of the voltage dip. In each computational step, the remaining torque can be estimated by subtracting to the initial aerodynamic torque when the voltage dip starts, the result of multiplying the derivative of torque with respect to pitch angle by the total pitch angle increment from the moment the dip voltage starts. At step 206, the WTG controller 126 commands to the pitch system 130 to move towards feather with a specific rate calculated to avoid generator over speed taking into account remaining transmitted torque Tt (aerodynamic torque). In this point, the main objective is to avoid the over speed alarm triggering but it is mandatory to compromise the least possible the recovering time requirement. In order to do that, at the beginning of the dip, the pitch movement rate command is calculated taking only into account the generator speed evolution (speed and acceleration values) and the physical constraints (pitch system restrictions), as dip voltage evolves, the pitch rate command is calculated no only depending on the previous commented factors but also on the remaining transmitted torque Tt. The contribution of each factor (generator speed, acceleration, remaining transmitted torque) can be evaluated by using per unit gains that multiply the maximum pitch rate fixed by physical constraints. The weight of the generator speed and acceleration factors are higher than the remaining transmitted torque Tt as the main objective in this part of the dip voltage transition is to avoid the over speed alarm. The evolution of the remaining transmitted torque Tt depends on the aerodynamics of the wind turbine and rotor inertia. As a reference value it can be considered that this factor do not affect to the pitch position evolution until the remaining transmitted torque Tt is below the 80% of the initial value. On the other side, as a reference value, if the generator speed is higher than 0.96% the effect of the transmitted torque Tt factor to the final pitch rate reference is neglectable.

Next, at step 208, the grid recovers from the voltage dip. The pitch reference is calculated according to the standard control laws. The converter control unit 124 calculates and sends to the WTG controller 126 a maximum power or torque value. The maximum active power can be calculated as the value of maximum active current generation multiplied by grid voltage.

At step 210, the wind turbine controller calculates the maximum saturation set point for the active power or torque reference subtracting an offset to the value coming from the converter control unit 124 to make sure that it is going to be possible to apply the DTD torque reference.

Figure 6A:
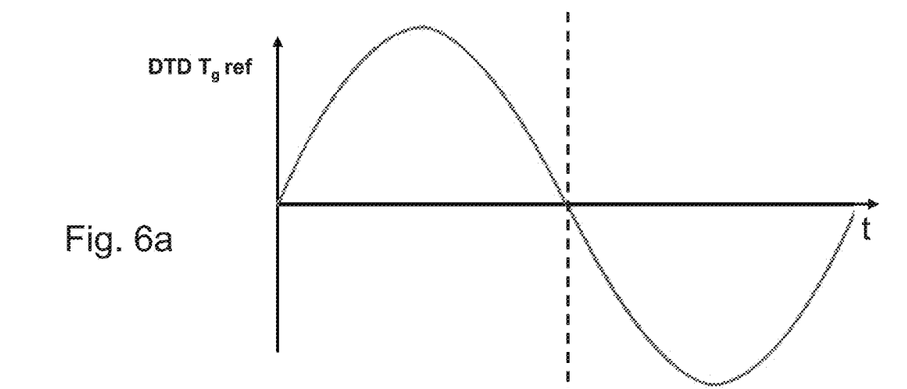
FIGS. 6a and 6b show how the generator torque or power reference rate varies when recovering from a voltage dip depending on the drive train oscillations. When the oscillation is in the positive half-plane the rate is higher.
Figure 6B:
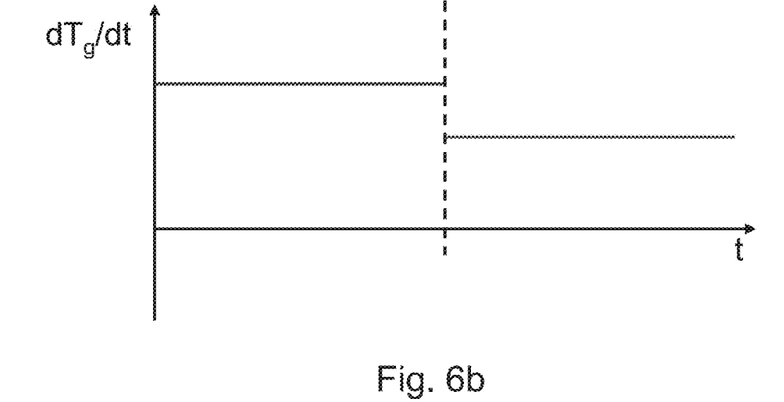

Next, at step 212, a generator torque or power reference is calculated using different rates depending on the drive train oscillations (FIG. 6), to minimize the transient torque overshoot and to enhance the damping to the drive train eigenfrequency oscillation mode taking into account the maximum power or torque calculated value and settling time restrictions. This reference is filtered with a first order filter if needed.

And finally at step 212, drive train damper (DTD) extra torque or active power is added to the previous reference originating the final command which is sent to the converter control unit 124.

Figures 7A, 7B, 7C:
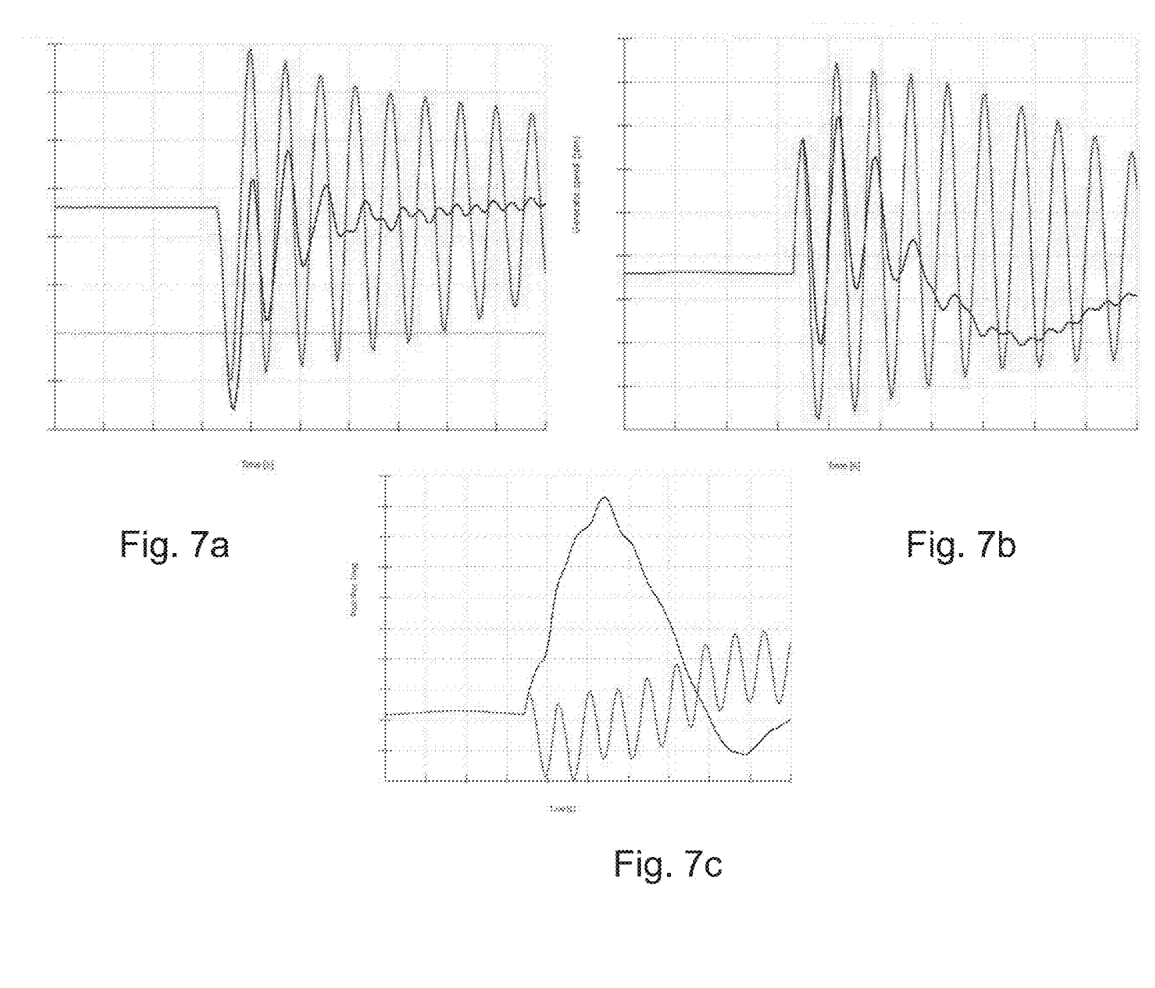
FIG. 7a-7c show the beneficial effects of applying the invention when a wind turbine faces a voltage dip scenario.

The application of this invention allows the wind turbine to keep on operating without stopping in a voltage dip scenario reducing the drive train torque overshoot more than 50% (FIG. 7).

In an embodiment of the disclosure, the algorithm can be deactivated by the user by setting a parameter value from one to zero.

In an embodiment of the disclosure, the wind turbine 100 is a doubly fed wind turbine 100. The doubly fed wind turbines 100 allow the generator output voltage and frequency to be maintained at constant values. But, the doubly fed wind turbines 100 are affected by the extra loads due to withstand voltage dips without disconnection. In another example of this embodiment, the wind turbine generator 120 uses a full converter technology in which the drive train is affected by the voltage dip. It should be appreciated that the algorithm is also applicable to those wind turbines with a full converter technology without brake chopper. If the wind turbine generator 120 has a brake chopper then the brake chopper could burn the active power that the grid side converter cannot deliver to the grid. Then the drive train in this case is not affected by the voltage dip as no change in torque happens due to voltage dip.

Any theory, mechanism of operation, proof, or finding stated herein is meant to further enhance understanding of principles of the present disclosure and is not intended to make the present disclosure in any way dependent upon such theory, mechanism of operation, illustrative embodiment, proof, or finding. It should be understood that while the use of the word preferable, preferably or preferred in the description above indicates that the feature so described can be more desirable, it nonetheless cannot be necessary and embodiments lacking the same can be contemplated as within the scope of the disclosure, that scope being defined by the claims that follow.

In reading the claims it is intended that when words such as "a," "an," "at least one," "at least a portion" are used there is no intention to limit the claim to only one item unless specifically stated to the contrary in the claim. When the language "at least a portion" and/or "a portion" is used the item can include a portion and/or the entire item unless specifically stated to the contrary.

It should be understood that only selected embodiments have been shown and described and that all possible alternatives, modifications, aspects, combinations, principles, variations, and equivalents that come within the spirit of the disclosure as defined herein or by any of the following claims are desired to be protected. While embodiments of the disclosure have been illustrated and described in detail in the drawings and foregoing description, the same are to be considered as illustrative and not intended to be exhaustive or to limit the disclosure to the precise forms disclosed.

Additional alternatives, modifications and, variations can be apparent to those skilled in the art. Also, while multiple inventive aspects and principles can have been presented, they need not be utilized in combination, and various combinations of inventive aspects and principles are possible in light of the various embodiments provided above.

What is claimed is:

1. A method of reducing mechanical load in a wind turbine when facing a grid voltage dip, the wind turbine having a drive train, a converter control unit, and a wind turbine generator controller, the method comprising:
   receiving an indication signal by the wind turbine generator controller from the converter control unit, the indication signal indicating a voltage dip in the wind turbine;
   commanding to move the pitch angle of the blade towards a feather position with a specific rate;
   delivering a maximum active power generation value by the converter control unit to the wind turbine generator controller after the grid recovers;
   setting a saturation value of the set points for the drive train to assure a correct Drive Train Damper action application, the saturation value set by the converter control unit depending on the maximum active power generation value;
   ramping up the power or torque set points with different rates according to the Drive Train Damper action to come up with a ramped value of the power taking into account network operators settling time restrictions;
   applying a first order filter to the ramped value of the power to reduce the torque overshoot; and
   applying the drive train damper torque command to the ramped value of the power in order to reduce the mechanical load in the wind turbine and to damp the oscillation in the wind turbine generator.

2. The method of claim 1, wherein the specific rate of the pitch movement is calculated to avoid generator overspeed taking into account remaining transmitted torque $T_t$ (aerodynamic torque).

3. The method of claim 1, wherein remaining aerodynamic torque during any moment of the voltage dip is calculated by an algorithm that uses as parameters an initial aerodynamic torque and a derivative of torque with respect to the pitch angle.

4. The method of claim 1, wherein a maximum saturation active power or torque value is set as subtraction of the maximum active power generation value sent by the converter control unit and a variable offset to ensure the correct DTD Drive Train Damper torque reference application.

5. The method of claim 1, wherein the wind turbine generator is a doubly fed induction generator.

6. The method of claim 1, wherein the wind turbine generator uses a full converter technology in which the drive train is affected by voltage dips.

7. The method of claim 1, wherein the method is used during the voltage dip and after the voltage dip is cleared.

8. The method of claim 1, further comprising a step of deactivating the method.

9. The method of claim 1, wherein the maximum active power generation value is calculated as a value of maximum active current generation by the converter multiplied by the grid voltage.

10. A method of smart power management during a voltage dip in a wind turbine, the method comprising:
   receiving by the wind turbine generator controller receives an indication signal from the converter control unit, the indication signal indicating a voltage dip in the wind turbine;
   delivering a maximum active power generation value by the converter control unit to the wind turbine generator controller;
   commanding to move the pitch angle of the blades towards a feather position with a specific rate;
   delivering a maximum active power generation value by the converter control unit to the wind turbine generator controller after the grid recovers;
   setting a saturation value of the set points for the drive train to assure a correct Drive Train Damper action application, the saturation value set by the converter control unit depending on the maximum active power generation value;
   ramping up the power or torque set points with different rates according to the Drive Train Damper action to come up with a ramped value of the power taking into account network operators settling time restrictions;
   applying a first order filter to the ramped value of the power to soften e reduce the torque overshoot; and
   applying the drive train damper torque command to the ramped value of the power in order to reduce the mechanical load in the wind turbine and to damp the oscillation in the wind turbine generator.

* * * * *